(12) United States Patent
Xu et al.

(10) Patent No.: US 11,206,821 B2
(45) Date of Patent: Dec. 28, 2021

(54) FISHING REEL COMPRISING BEARING

(71) Applicant: Yangzhou Yuansheng Machinery Co., Ltd., Yangzhou (CN)

(72) Inventors: Zhilin Xu, Yangzhou (CN); Zhenggao Zhu, Yangzhou (CN)

(73) Assignee: YANGZHOU YUANSHENG MACHINERY CO., LTD., Yangzhou (CN)

(*) Notice: Subject to any disclaimer, the term of this patent is extended or adjusted under 35 U.S.C. 154(b) by 0 days.

(21) Appl. No.: 16/987,365

(22) Filed: Aug. 6, 2020

(65) Prior Publication Data

US 2020/0359613 A1  Nov. 19, 2020

Related U.S. Application Data

(63) Continuation-in-part of application No. PCT/CN2018/095763, filed on Jul. 16, 2018.

(30) Foreign Application Priority Data

Jun. 22, 2018 (CN) .......................... 201810651122.5
Jun. 22, 2018 (CN) .......................... 201820970287.4

(51) Int. Cl.
*A01K 89/01* (2006.01)
*A01K 89/015* (2006.01)
(52) U.S. Cl.
CPC ............... *A01K 89/011223* (2015.05); *A01K 89/01141* (2015.05); *A01K 89/01931* (2015.05)

(58) Field of Classification Search
CPC .......... A01K 89/0102; A01K 89/01029; A01K 89/01086; A01K 89/01088; A01K 89/011223
See application file for complete search history.

(56) References Cited

U.S. PATENT DOCUMENTS

| | | | | |
|---|---|---|---|---|
| 3,222,010 | A * | 12/1965 | Borgstrom | A01K 89/01029 242/237 |
| 3,481,554 | A * | 12/1969 | Hull | A01K 89/0102 242/240 |
| 3,836,092 | A * | 9/1974 | Hull | A01K 89/0102 242/238 |
| 9,210,920 | B1 * | 12/2015 | Zwayer | A01K 89/0108 |

FOREIGN PATENT DOCUMENTS

| DE | 1231949 B | * | 1/1967 | ............. A01K 89/01 |
|---|---|---|---|---|
| DE | 1265485 B | * | 4/1968 | ....... A01K 89/01121 |

* cited by examiner

*Primary Examiner* — Emmanuel M Marcelo
(74) *Attorney, Agent, or Firm* — Matthias Scholl P.C.; Matthias Scholl

(57) ABSTRACT

A fishing reel, including a frame; a reel seat disposed in the frame and including a central through hole; a spool disposed on the reel seat; a main shaft slidably disposed in the central through hole, and including a first end and a second end; a roller disposed on the first end of the main shaft; a first gear and a second gear both disposed on the second end of the main shaft; a handle disposed on the frame and connected to the first gear; a release button disposed on the frame; a first pressure spring disposed between the second gear and the main shaft; a line guide seat disposed on the roller; a line hanging rod disposed on the line guide seat; an elastic member disposed between the line guide seat and the roller; and a cam unit disposed on one end of the reel seat.

7 Claims, 5 Drawing Sheets

FISHING REEL COMPRISING BEARING

CROSS-REFERENCE TO RELAYED APPLICATIONS

This application is a continuation-in-part of International Patent Application No. PCT/CN2018/095763 with an international filing date of Jul. 16, 2018, designating the United States, and further claims foreign priority benefits to Chinese Patent Application No. 201810651122.5 filed on Jun. 22, 2018, and to Chinese Patent Application No. 201820970287.4 filed on Jun. 22, 2018. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, Mass. 02142.

BACKGROUND

The disclosure relates to a fishing reel comprising a bearing.

A fishing reel is a cylindrical device attached to a fishing rod used in winding and stowing line. Conventionally, the fishing reel comprises a roller, a line guide seat provided with a line hanging rod, and a reel seat provided with a cylindrical head and a cam disposed on the cylindrical head. When in use, the cam drives the line hanging rod to extend out of or retract into the roller to reel in or reel out a fishing line. In the process, there is a sliding friction between the line guide seat and the cylindrical head.

SUMMARY

Provided is a fishing reel, comprising:
a frame;
a reel seat disposed in the frame and comprising a central through hole;
a spool disposed on the reel seat and configured to receive a fishing line;
a main shaft slidably disposed in the central through hole, and comprising a first end and a second end;
a roller disposed on the first end of the main shaft and comprising a pin hole;
a first gear and a second gear both disposed on the second end of the main shaft, the first gear being engaged with the second gear and greater than the second gear in diameter, and the second gear disposed around the main shaft and connected to the main shaft in a transmission way;
a handle disposed on the frame and connected to the first gear in a transmission way;
a release button disposed on the frame and configured to push the main shaft to move forward;
a first pressure spring disposed between the second gear and the main shaft and configured to push the main shaft to abut against a control end of the release button;
a line guide seat disposed on an inner end face of the roller;
a line hanging rod disposed on the line guide seat and corresponding to the pin hole of the roller;
an elastic member disposed between the line guide seat and the roller to drive the line hanging rod to retract into the roller; and
a cam unit disposed on one end of the reel seat to drive the line guide seat to push the line hanging rod to extend out of the roller.

The cam unit comprises a bearing and an end cover; the bearing is disposed on the one end of the reel seat and limited by the end cover; the end cover comprises a first end in threaded connection to the reel seat, and a second end provided with a cam disposed on the bearing.

The cam comprises a first edge comprising a first circular surface overlapping a circular surface of the bearing, and a second edge comprising a second circular surface contracted towards a center of the bearing; and the first circular surface is connected to the second circular surface through smooth transition.

To improve the stability of reeling in/out a fishing line, the inner end face of the roller is provided with two line guide seats symmetrically-disposed with respect to the bearing; each line guide seat is provided with the line hanging rod; the roller comprises the pin hole corresponding to the line hanging rod; the elastic member is disposed between the line guide seat and the roller to drive the line hanging rod to retract into the roller; and the cam comprises two oppositely-disposed first edges each comprising a first circular surface overlapping the circular surface of the bearing, and two oppositely-disposed second edges each comprising a second circular surface contracted towards the center of the bearing; and the first circular surface is connected to the second circular surface through smooth transition.

The elastic member is a torsion spring comprising a first end disposed on the line guide seat, and a second end disposed on a side wall of the roller.

The elastic member is a second compression spring disposed between the roller and the line guide seat.

The following advantages are associated with the fishing reel of the disclosure. The fishing reel comprises the bearing which is configured to drive the line hanging rod to extend out of the roller. Thus, the friction between the line guide seat and the bearing is a rolling friction.

DETAILED DESCRIPTIONS

Figure 1:
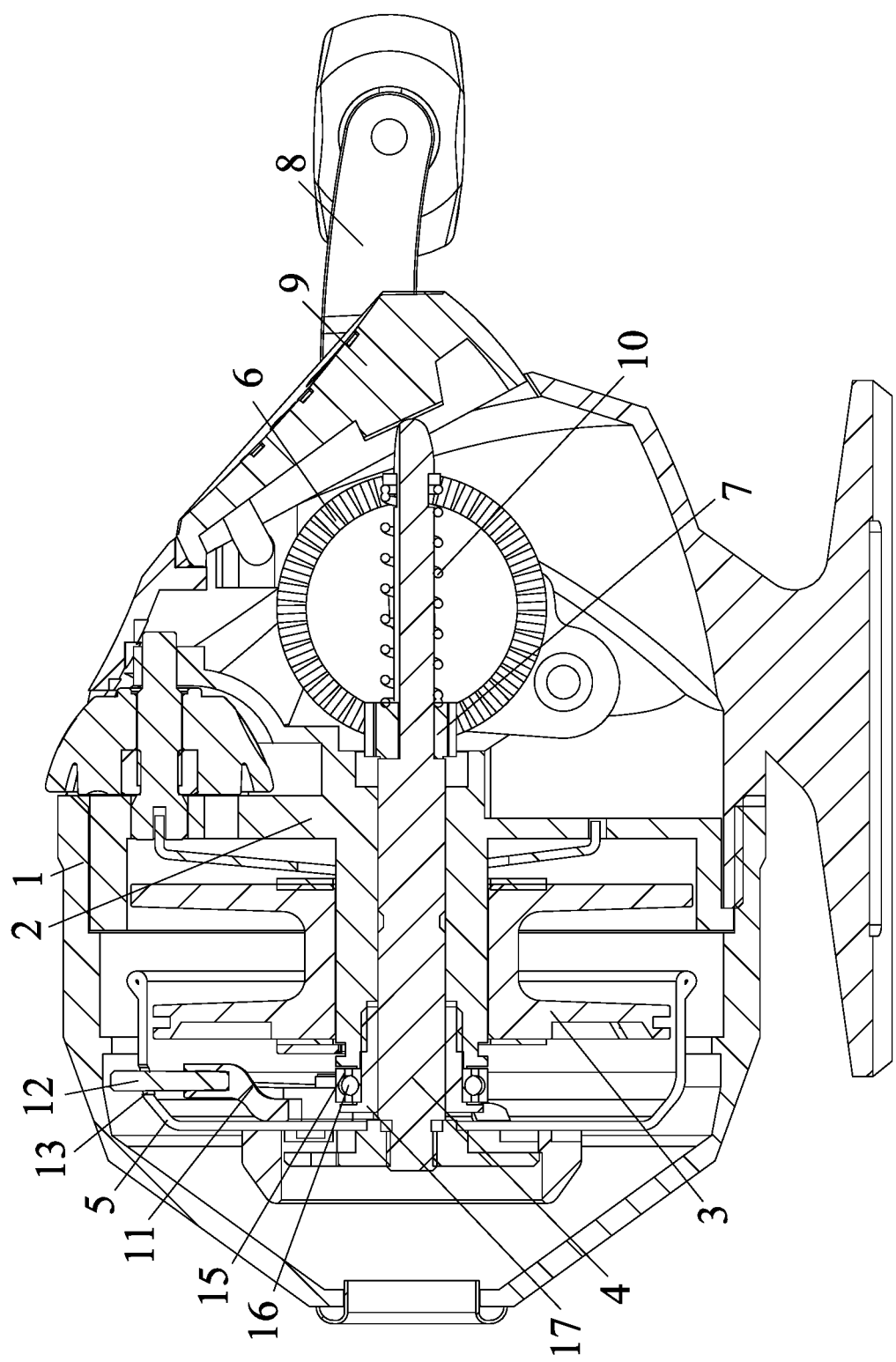
FIG. 1 is a schematic diagram of a fishing reel in Example 1 of the disclosure.
Figure 2:
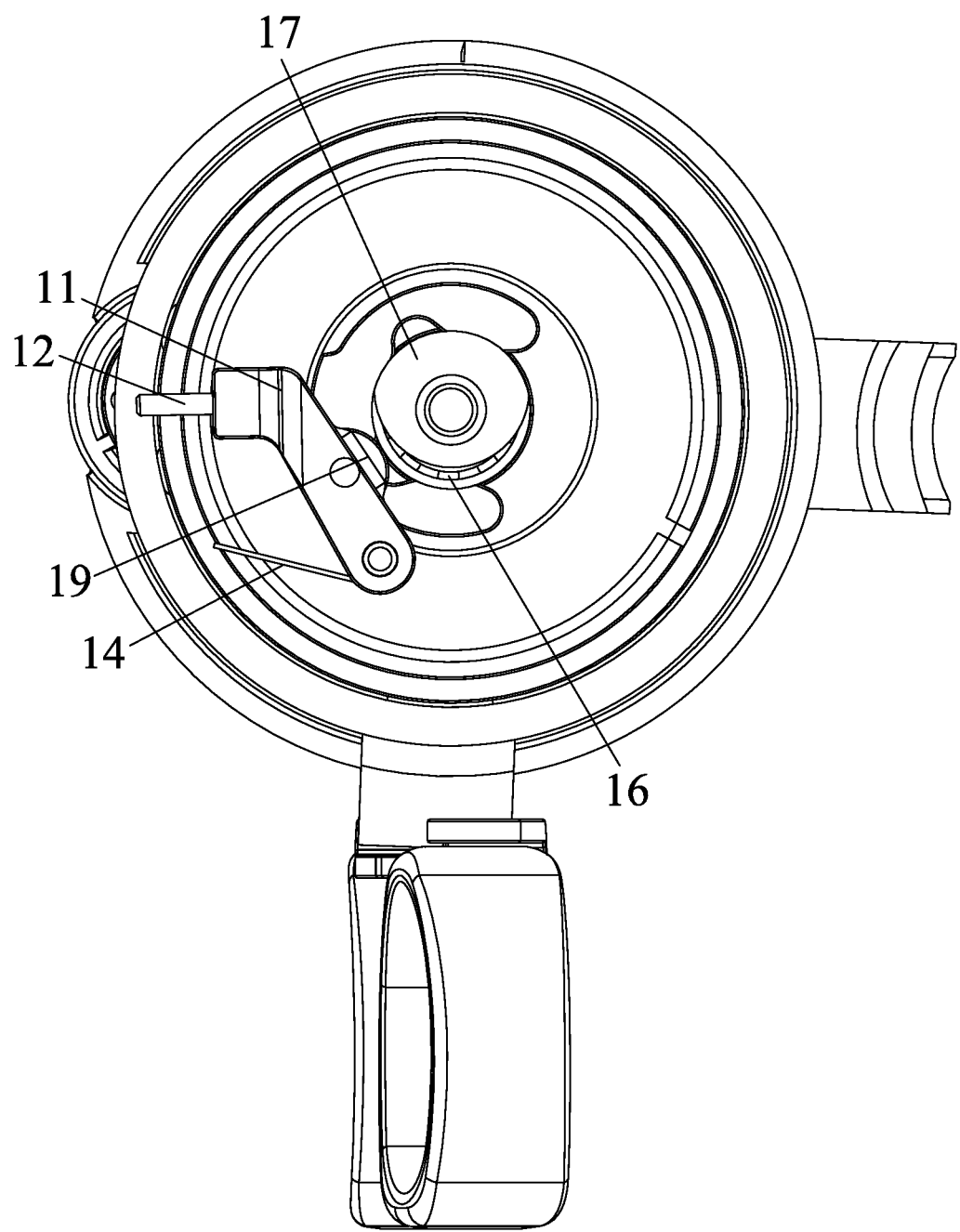
FIG. 2 is a schematic diagram showing a cooperation of a cam unit and a line guide seat of a fishing reel in Example 1 of the disclosure.
Figure 3:
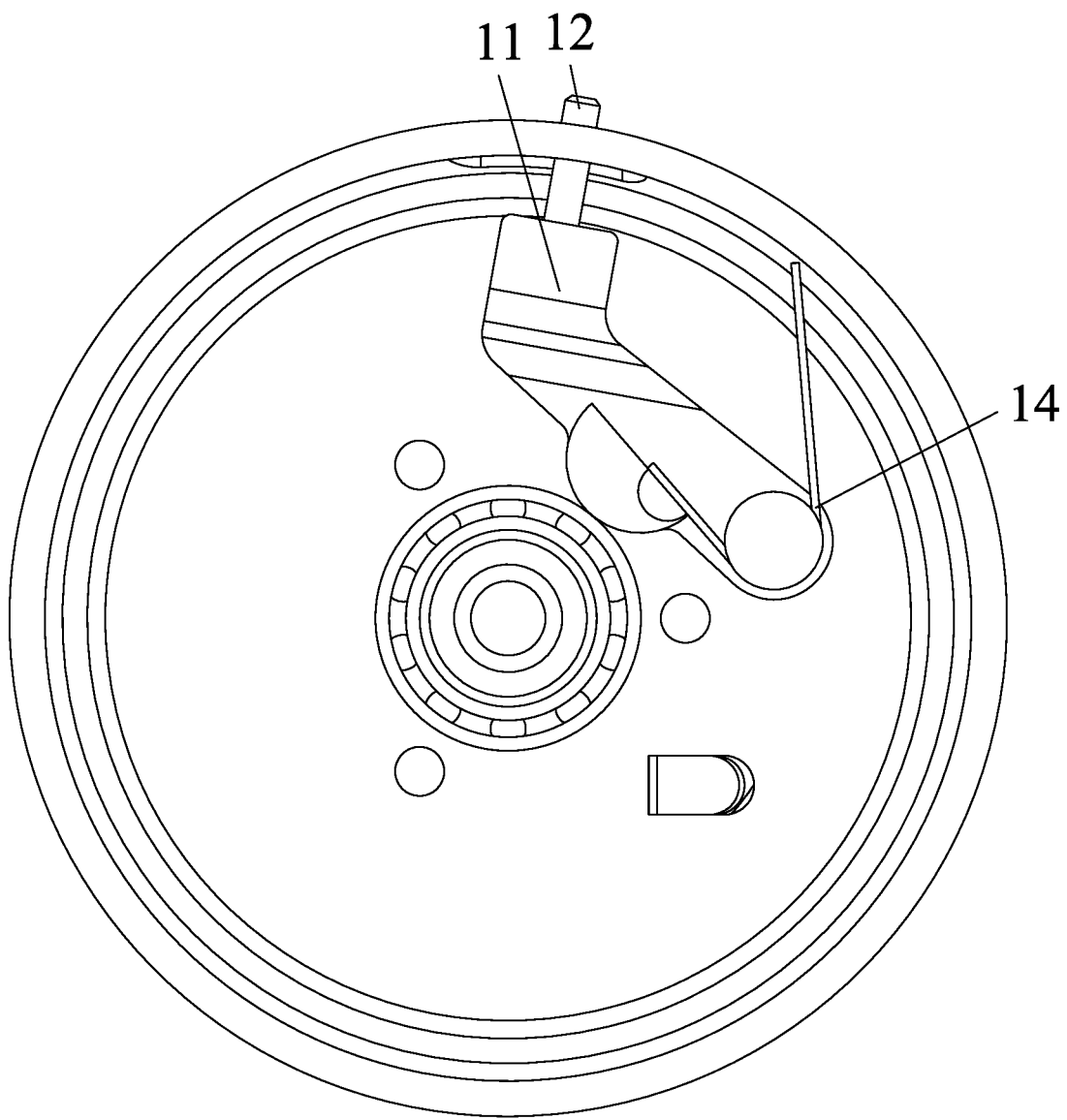
FIG. 3 is a schematic diagram showing a cooperation of a line guide seat and a bearing of a fishing reel in Example 1 of the disclosure.

To further illustrate, embodiments detailing a fishing reel are described below. It should be noted that the following embodiments are intended to describe and not to limit the disclosure.

Example 1

The disclosure provides a fishing reel comprising a frame 1. A reel seat 2 is disposed in the frame 1 and comprises a central through hole. A spool 3 is disposed on the reel seat 2 for winding a fishing line. A main shaft 4 is slidably disposed in the central through hole of the reel seat, and comprising a first end and a second end. A roller 5 is disposed on the first end of the main shaft. A first gear 6 and a second gear 7 are both disposed on the second end of the main shaft 4 in the frame 1. The first gear 6 is engaged with the second gear 7 and is greater than the second gear in diameter. A handle 8 is disposed on the frame 1 and is connected to the first gear 6 in a transmission way. The second gear 7 is disposed around the main shaft and is connected to the main shaft 4 in a transmission way. A release button 9 is disposed on the frame 1 and is configured to push the main shaft to move forward. A first pressure spring 10 is disposed between the second gear 7 and the main shaft 4 to push the main shaft 4 to abut against a control end of the release button 9.

A cam unit 15 is disposed on one end of the reel seat 2. The cam unit 15 comprises a bearing 16 and an end cover 17. The bearing is disposed on the one end of the reel seat 2 and limited by the end cover 17. The end cover 17 comprises a first end in threaded connection to the reel seat 2, and a second end provided with a cam (not shown in the figures) disposed on the bearing 16. The cam comprises a first edge comprising a first circular surface overlapping the circular surface of the bearing, and a second edge comprising a second circular surface contracted towards the center of the bearing 16; and the first circular surface is connected to the second circular surface through smooth transition.

A hook-shaped line guide seat 11 is disposed on the inner end face of the roller 5. One end of the line guide seat 11 is provided with a line hanging rod 12. The roller 5 comprises a pin hole 13 corresponding to the line hanging rod 12. The side wall of the other end of the line guide seat 11 is provided an arc bump 19 abutting against the side wall of the bearing 16. The rotation of the bearing 16 drives the arc bump 19 to eject the line hanging rod 12 on the line guide seat 11 out of the roller 5. A torsion spring 14 is disposed between the line guide seat 11 and the roller 5 to drive the line hanging rod 12 to retract into the roller 5. The torsion spring 14 comprises a first end disposed on the line guide seat 11, and a second end disposed on the side wall of the roller 5.

The working principle of the fishing reel is detailed as follows.

In the process of reeling in a fishing line, rotate the bearing 16, and the line hanging rod 12 is ejected and extends out of the roller 5. The fishing line on the spool 3 is wound on the line hanging rod 12. Turn the handle 8, and the first gear 6 and the second gear 7 rotate. Thus, the main shaft 4 is driven to rotate, and so is the roller 5. The roller 5 drives the line hanging rod 12 to rotate whereby the fishing line is wound on the spool 3.

In the process of reeling out a fishing line, press the release button 9, and the main shaft 4 is pushed forward. The roller 5 and the line guide seat 11 on the roller 5 are driven to move forward. Thus, the arc bump 19 of the line guide seat 11 is engaged with the second circular surface of the cam. The bearing 16 pulls back the line guide seat 11, and under the action of the torsion spring 14, the line hanging rod 12 retracts into the roller 5. The fishing line is released cycle by cycle from the spool 3 under the effect of gravity of a fishing lure secured to the front end of the fishing line. After the fishing line is reeled out, turn the handle 8, and the main shaft 4 is driven to rotate. And then the rollers 5 rotates. The arc bump 19 on the line guide seat 11 is driven to rotate. When the arc bump 19 rotates to be engaged with the first circular surface of the cam, the main shaft 4 is reset under the action of the first pressure spring 10, so that the arc bump 19 of the line guide seat 11 abuts against the outer wall of the bearing 16, and the line hanging rod 12 extends out of the roller 5.

Example 2

Figure 4:
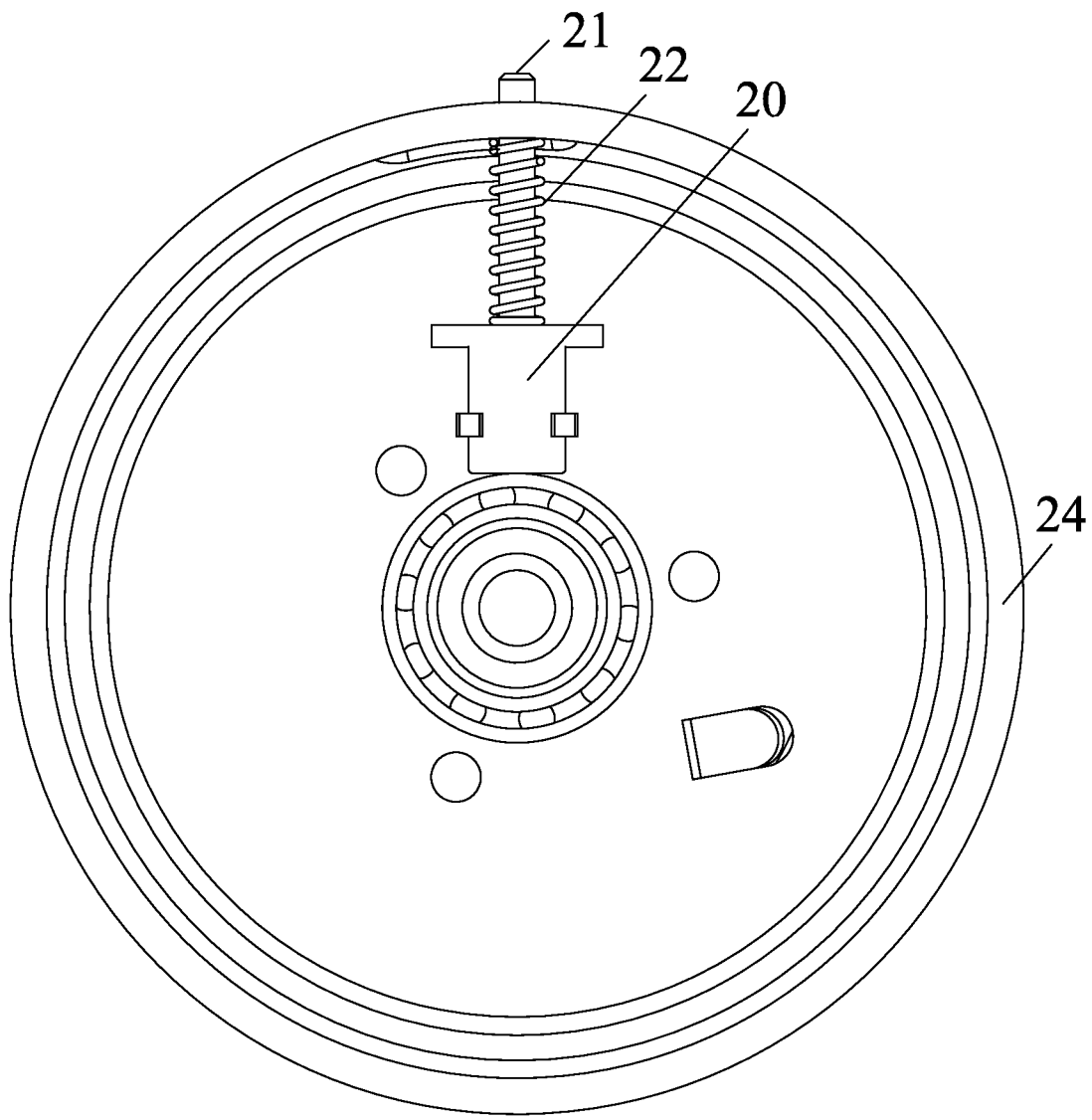
FIG. 4 is a schematic diagram of a fishing reel in Example 2 of the disclosure.

As shown in FIG. 4, the example provides a fishing reel that is basically the same as that in Example 1, except that: the line guide seat 20 is a square block. One end of the line guide seat 20 is connected to a line hanging rod 21. The line hanging rod 21 is disposed between the line guide seat 20 and the roller 24. A second compression spring 22 is wrapped around the line hanging rod 21. When the line guide seat 20 is engaged with the second circular surface of the cam, the second compression spring 22 is configured to push the line hanging rod 21 to retract into the roller 24.

Example 3

Figure 5:
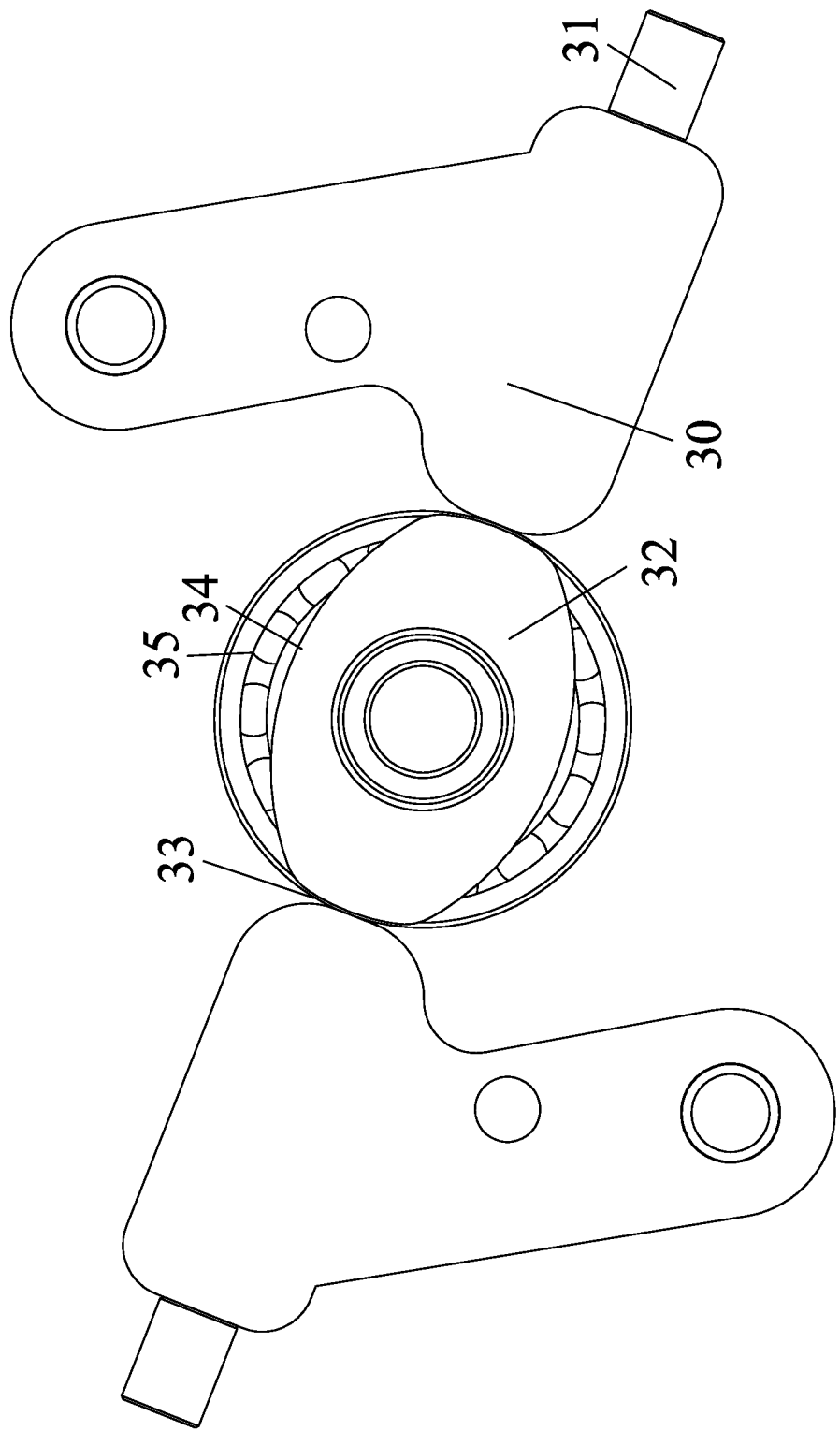
FIG. 5 is a schematic diagram of a fishing reel in Example 3 of the disclosure.

As shown in FIG. 5, the example provides a fishing reel that is basically the same as that in Example 1, except that: the inner end face of the roller (not shown in FIG. 5) is provided with two symmetrically-disposed line guide seats 30 with respect to the bearing; each line guide seat is provided with a line hanging rod 31; the roller comprises two pin holes corresponding to the two line hanging rods, respectively; an elastic member (not shown in FIG. 5) is disposed between each of the two line guide seat 30 and the roller to drive the line hanging rod 31 to retract into the roller.

The cam 32 comprises two first edges each comprising a first circular surface 33 overlapping the circular surface of the bearing, and two second edges each comprising a second circular surface 34 contracted towards the center of the bearing; and the first circular surface 33 is connected to the second circular surface 34 through smooth transition.

In the process of reeling out the fishing line, the main shaft drives the two line guide seats 30 disposed in the roller to cooperate with the two second circular surfaces 34 of the cam 32 respectively, so that the line hanging rods 31 on the two line guide seats 30 retract into the roller under the action of the elastic members. In the process of reeling in the fishing line, the two line guide seats 30 cooperate with the bearing to push the line hanging rods 31 extends out of the roller. The first circular surface 33 is connected to the second circular surface 34 through smooth transition. The working principle of the two line guide seats is the same as that of a single line guide seat in Example 1, and will not be repeated here.

It will be obvious to those skilled in the art that changes and modifications may be made, and therefore, the aim in the appended claims is to cover all such changes and modifications.

What is claimed is:

1. A device, comprising:
a frame;
a reel seat disposed in the frame and comprising a central through hole;
a spool disposed on the reel seat and configured to receive a fishing line;
a main shaft slidably disposed in the central through hole, the main shaft comprising a first end and a second end;
a roller disposed on the first end of the main shaft, the roller comprising a pin hole;
a first gear and a second gear both disposed on the second end of the main shaft, the first gear being engaged with the second gear and being greater than the second gear in diameter, and the second gear disposed around the main shaft and connected to the main shaft in a transmission way;

a handle disposed on the frame and connected to the first gear in a transmission way;

a release button disposed on the frame and configured to push the main shaft to move forward;

a first pressure spring disposed between the second gear and the main shaft and configured to push the main shaft to abut against a control end of the release button;

a line guide seat disposed on an inner end face of the roller;

a line hanging rod disposed on the line guide seat and corresponding to the pin hole of the roller;

an elastic member disposed between the line guide seat and the roller to drive the line hanging rod to retract into the roller; and a cam unit disposed on one end of the reel seat to drive the line guide seat to push the line hanging rod to extend out of the roller;

wherein:

the cam unit comprises a bearing and an end cover; the bearing is disposed on the one end of the reel seat and limited by the end cover; the end cover comprises a first end in threaded connection to the reel seat and a second end provided with a cam disposed on the bearing.

2. The device of claim 1, wherein the cam comprises a first edge comprising a first circular surface overlapping a circular surface of the bearing, and a second edge comprising a second circular surface contracted towards a center of the bearing; and the first circular surface is connected to the second circular surface through smooth transition.

3. The device of claim 2, wherein the inner end face of the roller is provided with two line guide seats symmetrically-disposed with respect to the bearing; each line guide seat is provided with the line hanging rod; the roller comprises the pin hole corresponding to the line hanging rod; the elastic member is disposed between the line guide seat and the roller to drive the line hanging rod to retract into the roller; and the cam comprises two oppositely-disposed first edges each comprising a first circular surface overlapping the circular surface of the bearing, and two oppositely-disposed second edges each comprising a second circular surface contracted towards the center of the bearing; and the first circular surface is connected to the second circular surface through smooth transition.

4. The device of claim 3, wherein the elastic member is a torsion spring comprising a first end disposed on the line guide seat, and a second end disposed on a side wall of the roller.

5. The device of claim 3, wherein the elastic member is a second compression spring disposed between the roller and the line guide seat.

6. The device of claim 1, wherein the elastic member is a torsion spring comprising a first end disposed on the line guide seat, and a second end disposed on a side wall of the roller.

7. The device of claim 1, wherein the elastic member is a second compression spring disposed between the roller and the line guide seat.

\* \* \* \* \*